United States Patent
Sekido (10) Patent No.: US 10,499,469 B2
(45) Date of Patent: Dec. 3, 2019

(54) STROBE APPARATUS HAVING LIGHT-EMITTING SEMICONDUCTOR MODULE DRIVEN BY TWO-STEPPED DRIVE CURRENT

(71) Applicant: STANLEY ELECTRIC CO., LTD., Meguro-ku, Tokyo (JP)

(72) Inventor: Keizo Sekido, Tokyo-to (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 16/268,731

(22) Filed: Feb. 6, 2019

(65) Prior Publication Data

US 2019/0261479 A1    Aug. 22, 2019

(30) Foreign Application Priority Data

Feb. 22, 2018 (JP) ................ 2018-030012

(51) Int. Cl.
 *H05B 33/08* (2006.01)
 *H02M 3/156* (2006.01)

(52) U.S. Cl.
 CPC ..... *H05B 33/0848* (2013.01); *H05B 33/0815* (2013.01); *H02M 3/156* (2013.01)

(58) Field of Classification Search
 CPC ............ H05B 33/0815; H05B 33/0818; H05B 33/0842; H05B 33/0845; H05B 33/0848; H05B 37/02; H05B 37/029; H05B 41/34; H02M 3/156; H02M 2001/0025; G03B 15/05
 See application file for complete search history.

(56) References Cited

U.S. PATENT DOCUMENTS

| 7,218,086 | B1 * | 5/2007 | Ritter | H05B 33/0815 323/284 |
| 7,804,256 | B2 * | 9/2010 | Melanson | H05B 33/0815 315/224 |
| 9,634,564 | B2 * | 4/2017 | Maede | H02M 3/157 |
| 9,891,503 | B2 | 2/2018 | Otsuka | |
| 2007/0257623 | A1 * | 11/2007 | Johnson | H05B 33/0818 315/193 |

FOREIGN PATENT DOCUMENTS

JP    2015152725 A    8/2015

* cited by examiner

*Primary Examiner* — Haissa Philogene
(74) *Attorney, Agent, or Firm* — Holtz, Holtz & Volek PC (57) ABSTRACT

A strobe apparatus includes: a light-emitting semiconductor module; a current sense resistor connected in series to the light-emitting semiconductor module and adapted to sense a drive current flowing through the light-emitting semiconductor module to generate a sense voltage; a step-up voltage converter connected to the light-emitting semiconductor module and the current resistor and adapted to supply the drive current to the light-emitting semiconductor module and the current resistor; and a voltage converter controlling unit connected to the step-up voltage converter and the current sense resistor, and adapted to control the step-up voltage converter in accordance with a difference between the sense voltage and an input voltage, so that the drive current has a first level current followed by a second level current larger than the first level current.

13 Claims, 8 Drawing Sheets

STROBE APPARATUS HAVING LIGHT-EMITTING SEMICONDUCTOR MODULE DRIVEN BY TWO-STEPPED DRIVE CURRENT

This application claims the priority benefit under 35 U.S.C. § 119 to Japanese Patent Application No. JP2018-030012 filed on Feb. 22, 2018, which disclosure is hereby incorporated in its entirety by reference.

BACKGROUND

Field

The presently disclosed subject matter relates to a strobe apparatus having a light-emitting semiconductor module element such as a light-emitting diode (LED) module.

Description of the Related Art

Recently, a strobe apparatus having a small-sized light-emitting semiconductor module such as an LED module instead of a large-scaled Xe tube has been incorporated into a digital camera, a mobile phone and so on.

A prior art strobe apparatus having an LED module is constructed by a step-up DC-DC converter for increasing the voltage of a battery to a higher voltage applied to the LED module, and a DC-DC converter controlling unit for performing a feedback control operation upon the step-up DC-DC converter in accordance with a sense current flowing through the LED module, so the sense current flowing through the LED module is brought close to a predetermined definite current determined by an input signal (reference signal), thus maintaining a high luminous intensity of the LED module (see: JP2015-152725).

In more detail, in order to rapidly turn on the LED module as a strobe light, a one-stepped rectangular pulse signal is given as the input signal (reference signal) to the DC-DC converter controlling unit, so that the DC-DC converter controlling unit supplies a pulse width modulation (PWM) drive signal to the step-up DC-DC converter. In this case, the on-duty ratio of the PWM drive signal is formed in accordance with an error signal between a sense current flowing through the LED module and the input signal to control the step-up DC-DC converter.

In the above-described prior art strobe apparatus, however, at an initial transient state of the one-stepped rectangular pulse signal, a rush current larger than the predetermined definite current flows through the LED module, which would exceed the absolute maximum rated current of the LED module. Thus, the reliability of the LED module would deteriorate. This will be later explained with reference to FIGS. 3A and 3B.

Contrary to the above, if the rush current is made lower than the absolute maximum rated current, the current flowing through the LED module in a stable state would be much lower than the absolute maximum rated current, which would reduce the luminous intensity of the LED module. This will be later explained with reference to FIGS. 4A and 4B.

Note that, if the rising of the one-stepped rectangular pulse signal is mitigated, no rush current would flow through the LED module. In this case, however, a rapidly-rising luminance intensity would not be realized, which is not suitable as a strobe light.

SUMMARY

The presently disclosed subject matter seeks to solve one or more of the above-described problems.

According to the presently disclosed subject matter, a strobe apparatus includes: a light-emitting semiconductor module; a current sense resistor connected in series to the light-emitting semiconductor module and adapted to sense a drive current flowing through the light-emitting semiconductor module to generate a sense voltage; a step-up voltage converter connected to the light-emitting semiconductor module and the current resistor and adapted to supply the drive current to the light-emitting semiconductor module and the current resistor; and a voltage converter controlling unit connected to the step-up voltage converter and the current sense resistor, and adapted to control the step-up voltage converter in accordance with a difference between the sense voltage and an input voltage, so that the drive current has a first level current followed by a second level current larger than the first level current.

According to the presently disclosed subject matter, since the drive current flowing through the light-emitting semiconductor module is driven in a two-stepped manner, the rush current can be suppressed while the drive current flowing through the light-emitting semiconductor module for a stable state can be increased to maintain the luminous intensity.

BRIEF DESCRIPTION OF THE DRAWINGS

The above and other advantages and features of the presently disclosed subject matter will be more apparent from the following description of certain embodiments, compared with the prior art, taken in conjunction with the accompanying drawings, wherein.

DETAILED DESCRIPTION OF EXEMPLARY EMBODIMENTS

Figure 1:
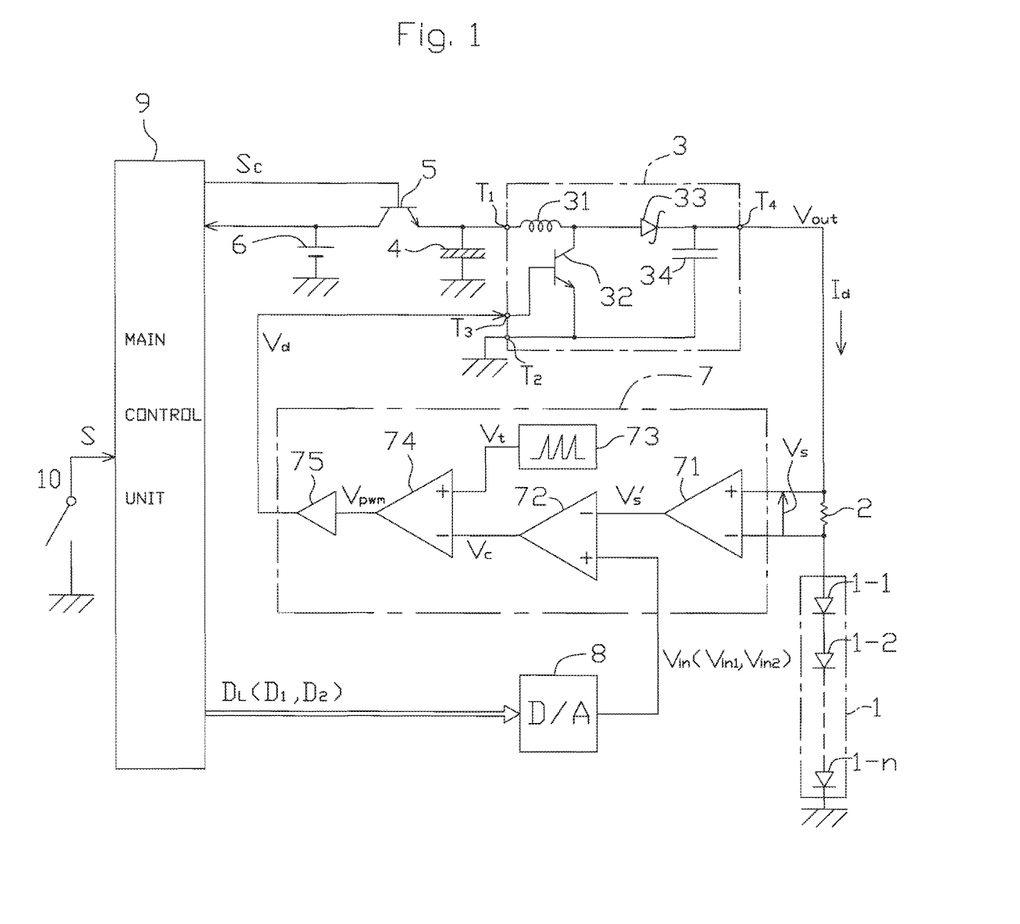
FIG. 1 is a circuit diagram illustrating a first embodiment of the strobe apparatus according to the presently disclosed subject matter.

FIG. 1 is a circuit diagram illustrating a first embodiment of the strobe apparatus according to the presently disclosed subject matter.

In FIG. 1, the strobe apparatus is constructed by a light-emitting semiconductor module such as an LED module 1 formed by one or more light-emitting diode (LED) elements 1-1, 1-2, . . . , 1-n which are connected in series or in parallel with each other, and a current sense resistor 2 for sensing a drive current $I_d$ flowing through the LED module 1 to generate a sense voltage $V_s$.

A step-up DC-DC converter 3 applies its output voltage $V_{out}$ to the current sense resistor 2 and the LED module 1.

The step-up DC-DC converter 3 is supplied with a power supply voltage from an electrolytic capacitor 4 (or an electric double layer) which is connected via a switching element 5 such as an npn-type bipolar transistor to a battery 6 such as a lithium battery. In this case, the internal impedance of the electrolytic capacitor 4 (or the electric double layer) is much smaller than that of the battery 6, so that the voltage reduction by the electrolytic capacitor 4 can be reduced even when the drive current $I_d$ flowing through the step-up DC-DC converter 3 and the LED module 1 is increased.

The step-up DC-DC converter 3 is controlled by a DC-DC converter controlling unit 7 which receives the sense voltage $V_s$ from the current sense resistor 2 and an input voltage $V_{in}$ from an input circuit 8. That is, the step-up DC-DC converter 3 is feedback-controlled by the DC-DC converter controlling unit 7 using the sense voltage $V_s$ of the current sense resistor 2.

The switching element 5 and the input circuit 8 are controlled by a main control unit 9 which is constructed by a microcomputer or the like. The main control unit 9 is usually incorporated into a digital camera or a mobile phone. The main control unit 9 receives a strobe signal S from a strobe button 10 provided on the display unit (not shown) to transmit a charging signal $S_c$ to the switching element 5, thus charging the electrolytic capacitor 4 using the battery 6. Also, after the electrolytic capacitor 4 is charged, the main control unit 9 generates a luminous digital signal $D_L$ and transmits it to the input circuit 8.

The step-up DC-DC converter 3 is constructed by an inductor 31 having an input connected to a power supply terminal $T_1$ connected to the electrolytic capacitor 4 and an output, a switching element 32 such as an npn-type bipolar transistor or an n-type enhancement power MOS transistor connected between the output of the inductor 31 and another power supply terminal (the ground terminal) $T_2$ and controlled by a PWM drive voltage $V_d$ at a control terminal $T_3$, a diode 33 such as a Schottkey barrier diode having an anode connected to the output of the inductor 31, and a capacitor 34 connected between the cathode of the diode 33 and the ground terminal $T_2$ for generating the output voltage $V_{out}$ at an output terminal $T_4$.

In the step-up DC-DC converter 3, when the switching element 32 is turned on by the PWM drive voltage $V_d$ at the control terminal $T_3$, a current flows through the inductor 31 and the switching element 32 to the ground terminal $T_2$, so that the inductor 31 is excited to store energy therein. Then, when the switching element 32 is turned off by the PWM drive voltage $V_d$ at the control terminal $T_3$, the energy stored in the inductor 31 is flown via the diode 33 to the capacitor 34, which supplies the drive current $I_d$ to the LED module 1. Then, when the switching element 32 is again turned on by the PWM drive voltage $V_d$ of the control terminal $T_3$, a current flows again through the inductor 31 and the switching element 32 to store energy in the inductor 31 while the drive current $I_d$ is being supplied to the LED module 1. Then, when the switching element 32 is again turned off by the PWM drive voltage $V_d$ at the control terminal $T_3$, the energy stored in the inductor 31 is flown into the capacitor 34 which increases the energy in the capacitor 34. The above-mentioned operations are repeated, so that the output voltage $V_{out}$ of the step-up DC-DC converter 3 is stabilized in accordance with the on-duty ratio of the switching element 32 by the PWM drive voltage $V_d$ supplied from the DC-DC converter controlling unit 7 to the control terminal $T_3$.

The DC-DC converter controlling unit 7 is constructed by an error amplifier 71 for amplifying the sense voltage $V_s$ to generate an amplified sense voltage $V_s'$, a comparator 72 for comparing the amplified sense voltage $V_s'$ with the input voltage $V_{in}$ of the input circuit 8 to generate a comparison voltage $V_c$, a triangular-wave voltage generating circuit (oscillator) 73 for generating a triangular-wave (oscillation) voltage $V_t$, a PWM signal generating circuit 74 for comparing the comparison voltage $V_c$ of the comparator 72 with the triangular-wave voltage $V_t$ of the triangular-wave voltage generating circuit 73 to generate a PWM voltage $V_{pmw}$, and a driver 75 (amplifier) for amplifying the PWM voltage $V_{pmw}$ to generate the PWM drive voltage $V_d$ for turning on and off the switching element 32. In this case, the on-duty ratio of the PWM drive voltage $V_d$ is changed in accordance with the comparison voltage $V_c$ of the comparator 72, so that the amplified sense voltage $V_s'$ is brought close to the input voltage $V_{in}$.

The input circuit 8 is formed by a digital-to-analog (D/A) converter. Note that the D/A converter can be incorporated into the DC-DC converter controlling unit 7 or the main control unit 9.

The operation of the strobe apparatus of FIG. 1 is explained with reference to FIGS. 2A through 2E.

Figure 2A:
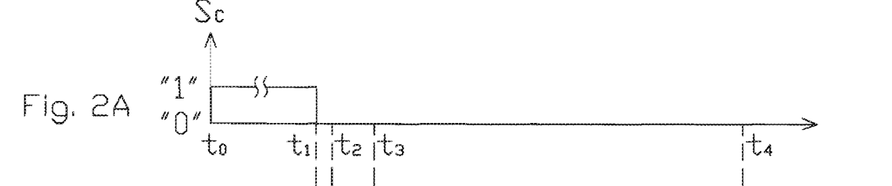
FIGS. 2A, 2B, 2C, 2D and 2E are timing diagrams for explaining the operation of the strobe apparatus of FIG. 1.

First, at time $t_0$, when the strobe button 10 on the display unit (not shown) is turned on, the main control unit 9 generates a charging signal $S_c$ as illustrated in FIG. 2A to turn on the switching element 5, so that the electrolytic capacitor 4 is charged. Then, at time $t_1$, the main control unit 9 turns off the switching element 5, so that the charging operation of the electrolytic capacitor 4 is completed.

Figure 2B:
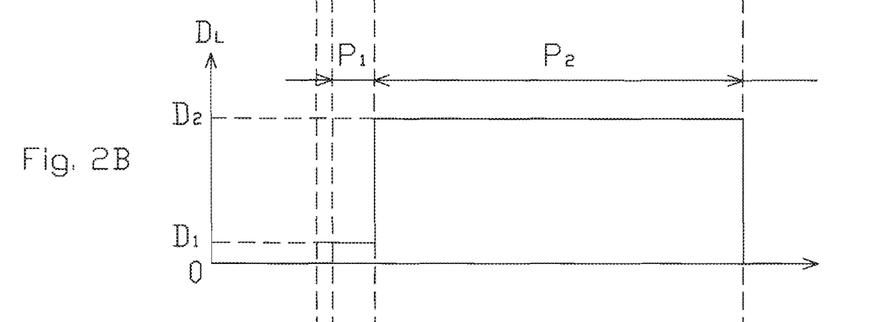
Figure 2C:
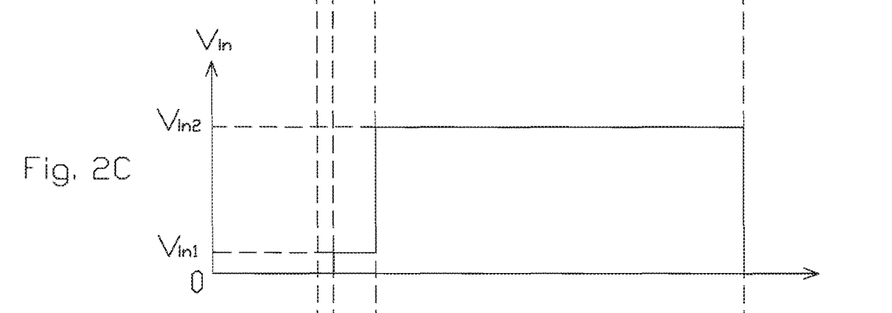
Figure 2D:
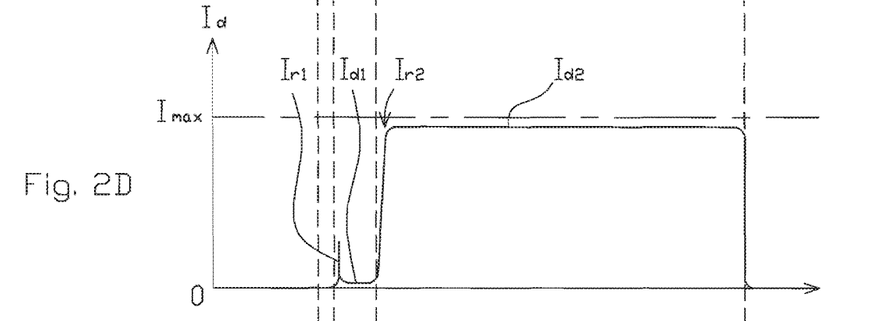

Next, at time $t_2$, a little later than time $t_1$, the main control unit 9 causes the digital value of the luminous digital signal $D_L$ to be a relatively small value $D_1$ for a standby time period $P_1$ as illustrated in FIG. 2B. Therefore, as illustrated in FIG. 2C, the digital value $D_1$ is converted by the input circuit (D/A converter) 8 to a relatively small input voltage $V_{in}=V_{in1}$. As a result, the drive current $I_d$ rises to a current $I_{d1}$ as illustrated in FIG. 2D. In this case, the current $I_{d1}$ includes a relatively large rush current $I_{r1}$ which is, however, much smaller than the absolute maximum rated current $I_{max}$.

Note that, although the standby time period $P_1$ is larger than about 0.5 ms; however, the standby time period $P_1$ is as small as possible in view of the reduction of power consumption.

Next, at time $t_3$, after the standby time period $P_1$ has passed, the main control unit 9 increases the digital value of the luminous digital signal $D_L$ to be a relatively large value $D_2$ as illustrated in FIG. 2B. Therefore, the digital value $D_2$ is converted by the input circuit (D/A converter) 8 to a relatively large input voltage $V_{in}=V_{in2}$ as illustrated in FIG. 2C. As a result, as illustrated in FIG. 2D, the drive current $I_d$ is increased from $I_{d1}$ to $I_{d2}$. In this case, generation of a rush current as indicated by $I_{r2}$ in the drive current $I_{d2}$ can be suppressed by the two-stepped drive current $I_d$. Actually, such a rush current $I_{r2}$ is hardly recognized. Therefore, the drive current $I_{d2}$ for a stable time period $P_2$ can be close to the maximum rated current $I_{max}$ while maintaining it below the absolute maximum rated current $I_{max}$.

Next, at time $t_4$, the main control unit 9 causes the luminous digital signal $D_L$ to be 0, thus completing the stable time period $P_2$.

Figure 2E:
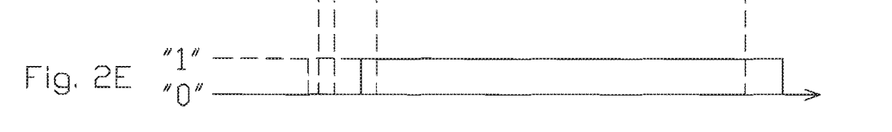

Also, as illustrated in FIG. 2E, which shows the opening of the shutter (not shown), the main control unit 9 opens the shutter to cover the stable time period $P_2$. In this case, the start time of opening the shutter is before time $t_2$ or between time $t_2$ and time $t_3$, while the end time of opening the shutter is after time $t_4$.

In FIG. 2C, the input voltage $V_{in1}$ is 3 to 50%, preferably, 3 to 5% of the input voltage $V_{in2}$. If $V_{in1} < 0.03 \cdot I_{in2}$, the suppressing effect of the rush current $I_{r2}$ in the drive current $I_{d2}$ would be mitigated, so that the rush current $I_{r2}$ would be larger than the absolute maximum rated current $I_{max}$. On the other hand, if $V_{in}>0.5 \cdot I_{in2}$, the rush current $I_{r1}$ in the drive current $I_{d1}$ would be increased to be larger than the absolute maximum rated current $I_{max}$.

Figure 3A:
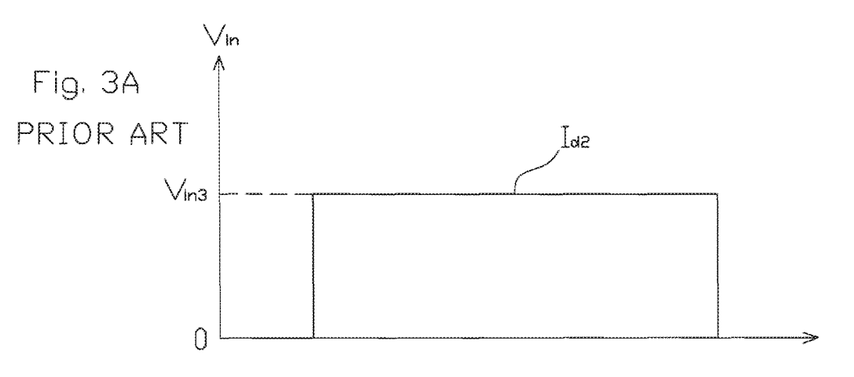
FIGS. 3A and 3B and FIGS. 4A and 4B are timing diagrams for explaining the operations of prior art strobe apparatuses.
Figure 3B:
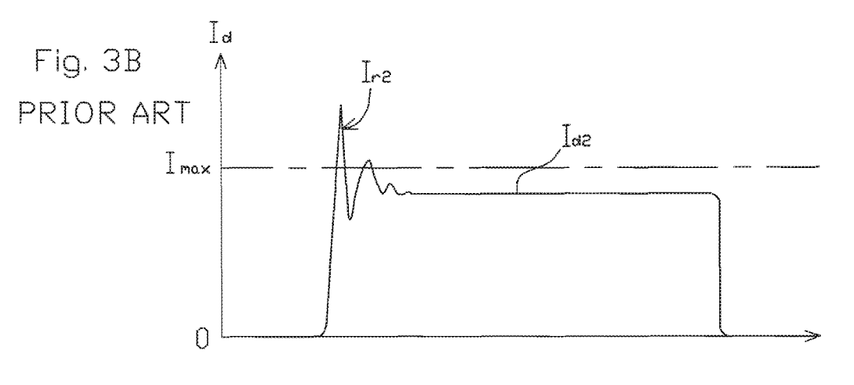

In a prior art strobe apparatus, as illustrated in FIG. 3A, the input voltage $V_{in}$ is formed by a one-step rectangular pulse voltage whose value $V_{in3}$ is relatively large. In this case, the drive current $I_d=I_{d2}$ becomes large, so that a large rush current $I_{r2}$ would appear in the stable drive current $I_{d2}$ as illustrated in FIG. 3B. This large rush current $I_{r2}$ would exceed the absolute maximum rated current $I_{max}$ of the LED module 1. Thus, the LED module 1 would deteriorate.

Figure 4A:
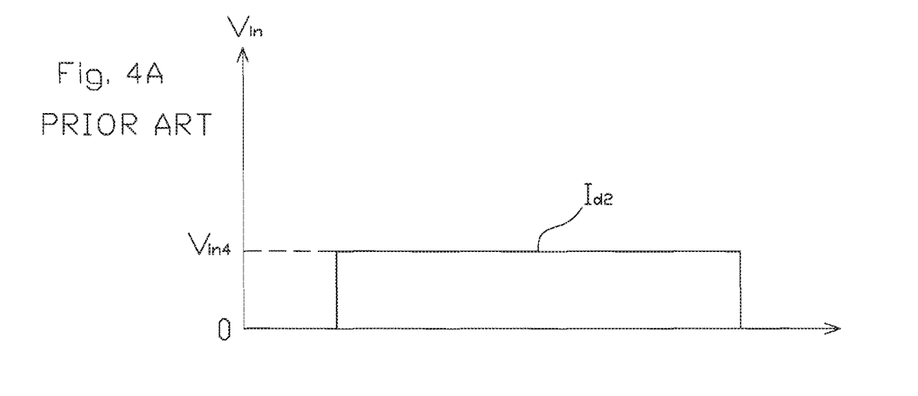
Figure 4B:
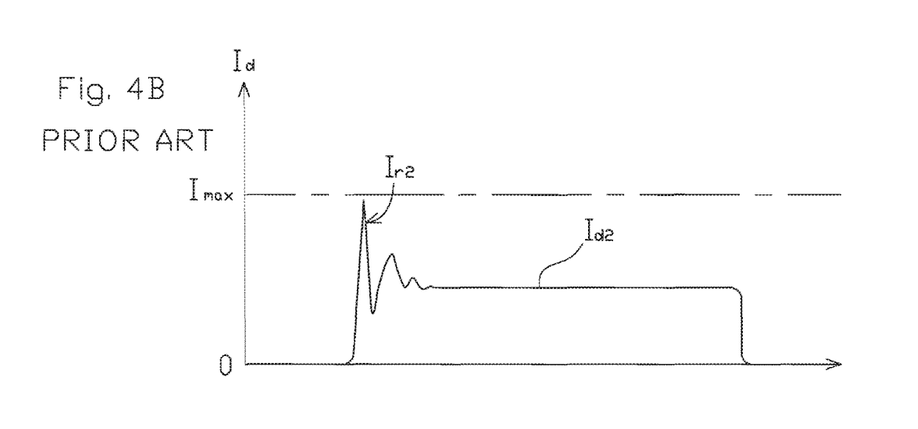

On the other hand, in another prior art strobe apparatus, as illustrated in FIG. 4A, the input voltage $V_{in}$ is formed by a one-stepped rectangular pulse voltage whose value $V_{in4}$ is relatively small. In this case, the drive current $I_d=I_{d2}$ becomes small, so that a small rush current $I_{r2}$ would appear in the stable drive current $I_{d2}$ as illustrated in FIG. 4B. This small rush current $I_{r2}$ would not exceed the absolute maximum rated current $I_{max}$ of the LED module 1. However, since the stable drive current $I_{d2}$ is much lower than the absolute maximum rated current $I_{max}$, the luminous intensity of the LED module 1 would reduce.

In the above-described first embodiment, since the input voltage $V_{in}$ of the input circuit 8 is two-stepped, the drive current $I_d$ flowing through the LED module 1 can be two-stepped. As a result, the rush current $I_{r2}$ for the stable time period $P_2$ can be suppressed while the drive current $I_{d2}$ for the stable time period $P_2$ can be increased.

Figure 5:
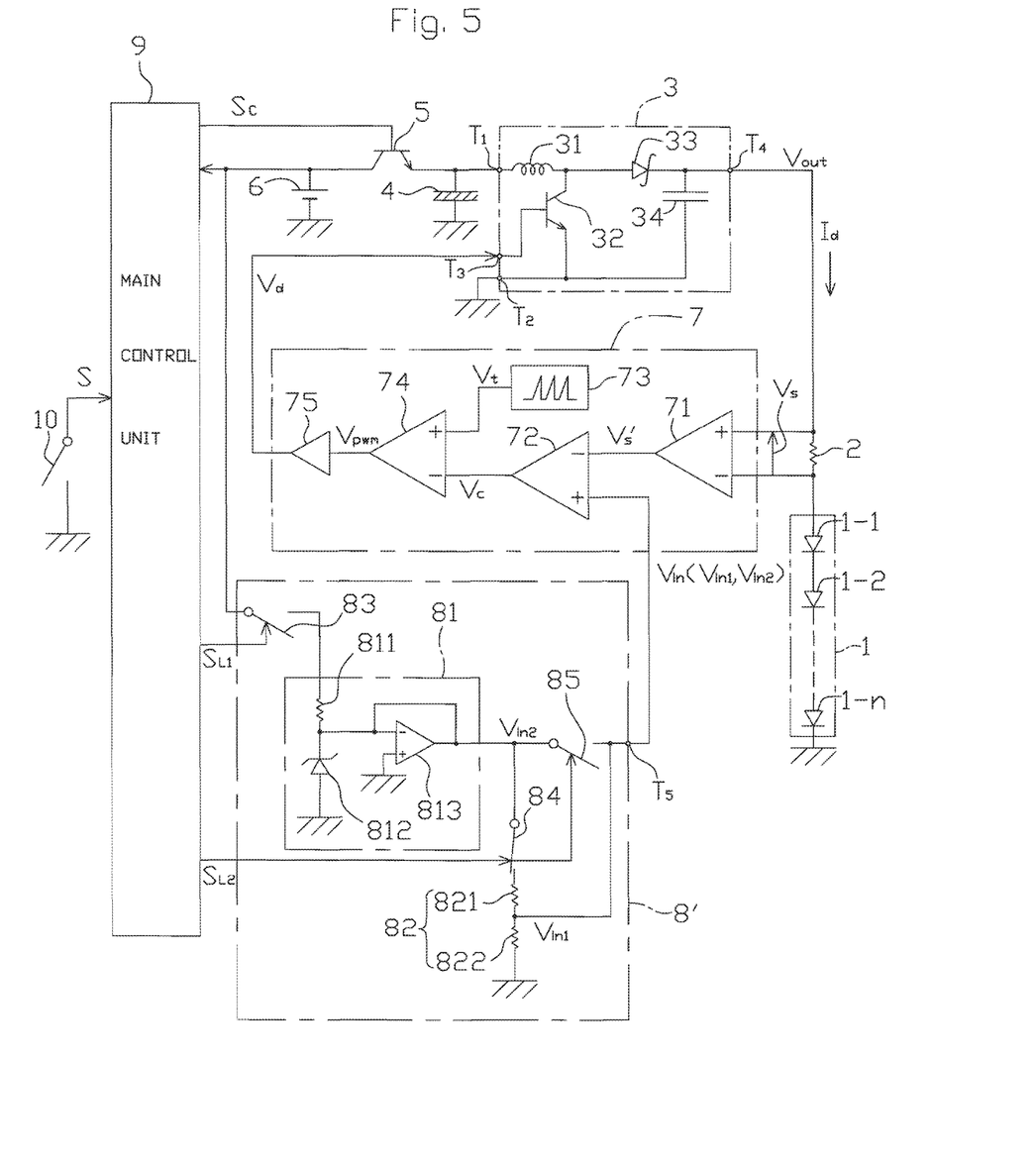
FIG. 5 is a circuit diagram illustrating a second embodiment of the strobe apparatus according to the presently disclosed subject matter.

FIG. 5 is a circuit diagram illustrating a second embodiment of the strobe apparatus according to the presently disclosed subject matter.

In FIG. 5, the input circuit 8 of FIG. 1 is replaced by an input circuit 8' which includes a constant voltage generating circuit 81 for generating an input voltage $V_{in2}$, a voltage divider 82 for generating an input voltage $V_{in1}$ at an output terminal $T_5$, a normally-off switch 83 between the battery 6 and the constant voltage generating circuit 81, a normally-on switch 84 between the output of the constant voltage generating circuit 81 and the voltage divider 82, and a normally-off switch 85 between the output of the constant voltage generating circuit 81 and the output terminal $T_5$. The constant voltage generating circuit 81 is formed by a resistor 811, a Zener diode 812 having a Zener voltage of $V_{in2}$, and a voltage buffer 813. The voltage divider 82 is formed by resistors 821 and 822 connected in series. Note that the Zener diode 812 can be replaced by a variable resistor.

The switch 83 is controlled by a luminous signal $S_{L1}$ from the main control unit 9, while the switches 83 and 84 are controlled by a luminous signal $S_{L2}$ from the main control unit 9. That is, when the switch 83 is in an on-state, and the switches 84 and 85 are in an on-state and in an off-state, respectively, the input voltage $V_{in1}$ appears at the output terminal $T_5$. On the other hand, when the switch 83 is in an on-state, and the switches 84 and 85 are in an off-state and in an on-state, respectively, the input voltage $V_{in2}$ appears at the output terminal $T_5$.

The operation of the strobe apparatus of FIG. 5 is explained with reference to FIGS. 6A through 6G.

Figure 6A:
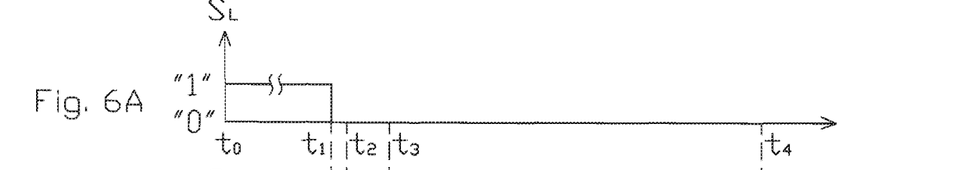
FIGS. 6A, 6B, 6C, 6D, 6E and 6F are timing diagrams for explaining the operation of the strobe apparatus of FIG. 5.

First, at time $t_0$, when the strobe button 10 on the display unit (not shown) is turned on, the main control unit 9 generates a charging signal $S_c$ as illustrated in FIG. 6A to turn on the switching element 5, so that the electrolytic capacitor 4 is charged. Then, at time $t_1$, the main control unit 9 turns off the switching element 5, so that the charging operation of the electrolytic capacitor 4 is completed.

Figure 6B:
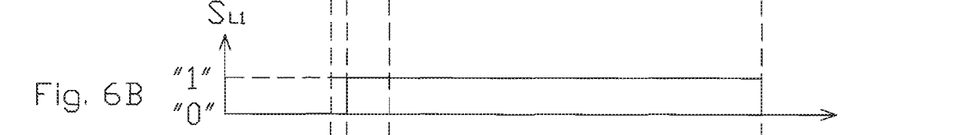
Figure 6C:
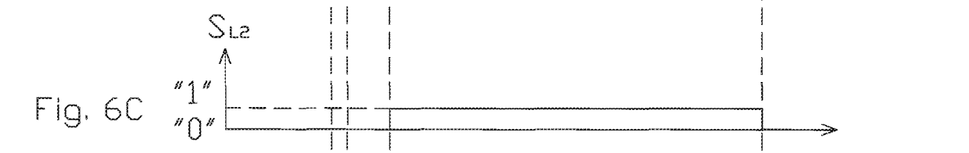
Figure 6D:
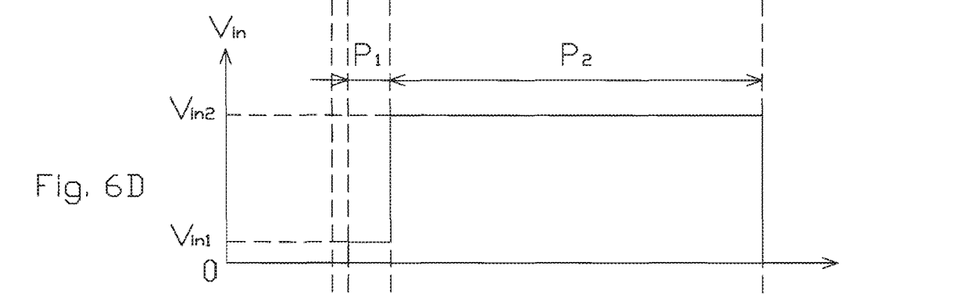
Figure 6E:
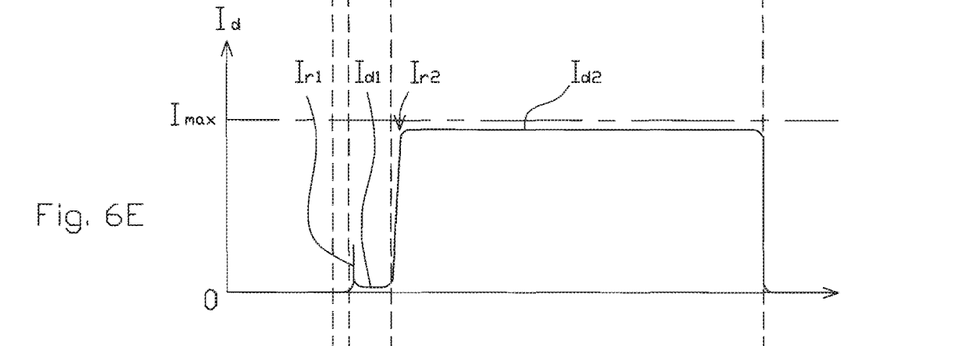

Next, at time $t_2$, a little later than time $t_1$, the main control unit 9 causes the luminous signal $S_{L1}$ to be "1" for a standby time period $P_1$ as illustrated in FIG. 6B. Therefore, the switch 83 is turned on, so that the constant voltage generating circuit 81 generates the input voltage $V_{in2}$. In this case, the luminous signal $S_{L2}$ is still at the level "0" as illustrated in FIG. 6C, so that the switches 84 and 85 are turned on and off, respectively. Therefore, the voltage divider 82 generates the input voltage $V_{in1}$ at the output terminal $T_5$ as illustrated in FIG. 6D. As a result, the drive current $I_d$ rises to $I_{d1}$ as illustrated in FIG. 6E. In this case, the current $I_{d1}$ includes a relatively large rush current $I_{r1}$ which is, however, much smaller than the absolute maximum rated current $I_{max}$.

Next, at time $t_3$, after the standby time period $P_1$ has passed, the main control unit 9 causes the luminous signal $S_{L2}$ to be "1" as illustrated in FIG. 6C. Therefore, the switches 84 and 85 are turned off and on, respectively, so that the input voltage $V_{in}=V_{in2}$ as illustrated in FIG. 6D appears at the output terminal $T_5$. As a result, as illustrated in FIG. 6E, the drive current $I_d$ is increased from $I_{d1}$ to $I_{d2}$. In this case, generation of a rush current as indicated by $I_{r2}$ in the drive current $I_{d2}$ can be suppressed by the two-stepped drive current $I_d$. Actually, such a rush current $I_{r2}$ is hardly recognized. Therefore, the drive current $I_{d2}$ for a stable time period $P_2$ can be close to the maximum rated current $I_{max}$ while maintaining it below the absolute maximum rated current $I_{max}$.

Next, at time $t_4$, the main control unit 9 causes the luminous signals $S_{L1}$ and $S_{L2}$ to be "0", thus completing the stable time period $P_2$.

Figure 6F:
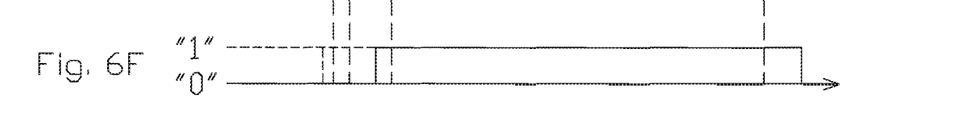

As illustrated in FIG. 6F, which shows the opening of the shutter (not shown), the main control unit 9 opens the shutter to cover the stable time period $P_2$. In this case, the start time of opening the shutter is before time $t_2$ or between time $t_2$ and time $t_3$, while the end time of opening the shutter is after time $t_4$.

Also, in the above-described second embodiment, since the input voltage $V_{in}$ of the input circuit 8' is two-stepped, the drive current $I_d$ flowing through the LED module 1 can be two-stepped. As a result, the rush current $I_{r2}$ for the stable time period $P_2$ can be suppressed while the drive current $I_{d2}$ for the stable time period $P_2$ can be increased.

Figure 7:
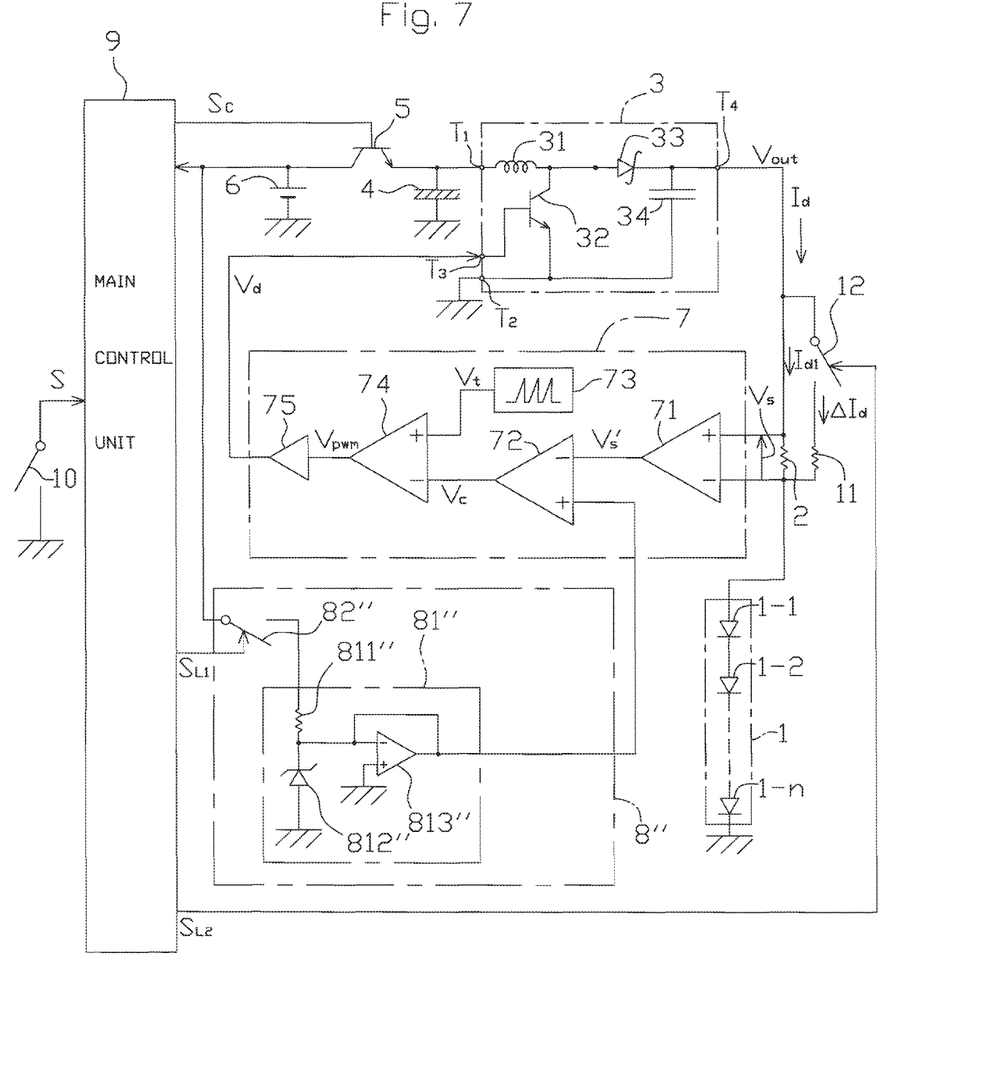
FIG. 7 is a circuit diagram illustrating a third embodiment of the strobe apparatus according to the presently disclosed subject matter.

FIG. 7 is a circuit diagram illustrating a third embodiment of the strobe apparatus according to the presently disclosed subject matter.

In FIG. 7, the input circuit 8 of FIG. 1 is replaced by an input circuit 8" which includes a constant voltage generating circuit 81" for generating an input voltage $V_{in1}$ at an output terminal $T_5$, and a normally-off switch 82" between the battery 6 and the constant voltage generating circuit 81". The constant voltage generating circuit 81" is formed by a resistor 811", a Zener diode 812" having a Zener voltage of $V_{in1}$, and a voltage buffer 813". Note that the Zener diode 812" can be replaced by a variable resistor.

Also, in FIG. 7, a series of a shunt resistor 11 and a normally-off switch 12 is connected in parallel with the current sense resistor 2. That is, when the switch 12 is in an off-state, the drive current $I_d$ is the drive current $I_{d1}$ flowing through the current sense resistor 2. On the other hand, when the switch 12 is in an on-state, the drive current $I_d$ is the drive current $I_{d1}$ flowing through the current sense resistor 2 plus a current $\Delta I_d$ flowing through the shunt resistor 11. In this case, the resistance value of the shunt resistor 11 is determined to satisfy:

$$I_{d2}=I_{d1}+\Delta I_d$$

The switch 82" is controlled by a luminous signal $S_{L1}$ from the main control unit 9, while the switch 12 is controlled by a luminous signal $S_{L2}$ from the main control unit 9. That is, when the switch 82" is in an on-state, the input voltage $V_{in1}$ appears at the output terminal $T_5$. On the other hand, when the switch 12 is in an on-state, the shunt resistor 11 is connected in parallel with the current sense resistor 2.

The operation of the strobe apparatus of FIG. 5 is explained with reference to FIGS. 8A through 8F.

Figure 8A:
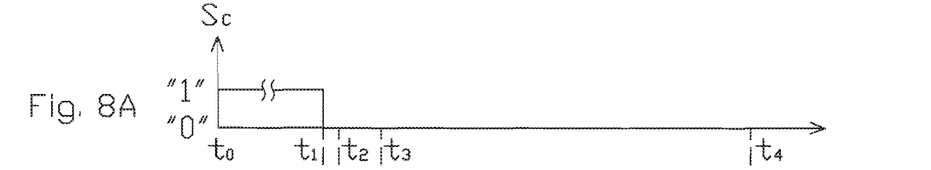
FIGS. 8A, 8B, 8C, 8D, 8E and 8F are timing diagrams for explaining the operation of the strobe apparatus of FIG. 7.

First, at time $t_0$, when the strobe button 10 on the display unit (not shown) is turned on, the main control unit 9 generates a charging signal $S_c$ as illustrated in FIG. 8A to turn on the switching element 5, so that the electrolytic capacitor 4 is charged. Then, at time $t_1$, the main control unit 9 turns off the switching element 5, so that the charging operation of the electrolytic capacitor 4 is completed.

Figure 8B:
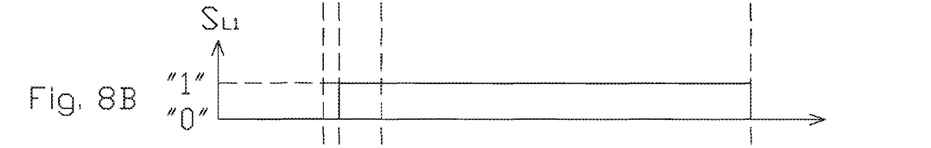
Figure 8C:
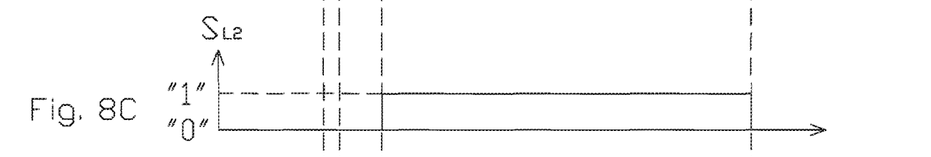
Figure 8D:
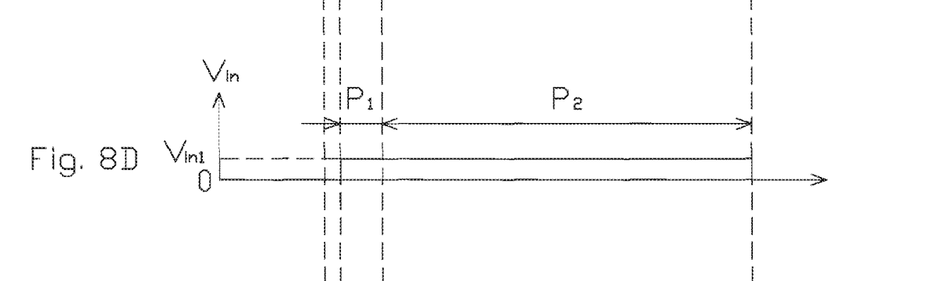
Figure 8E:
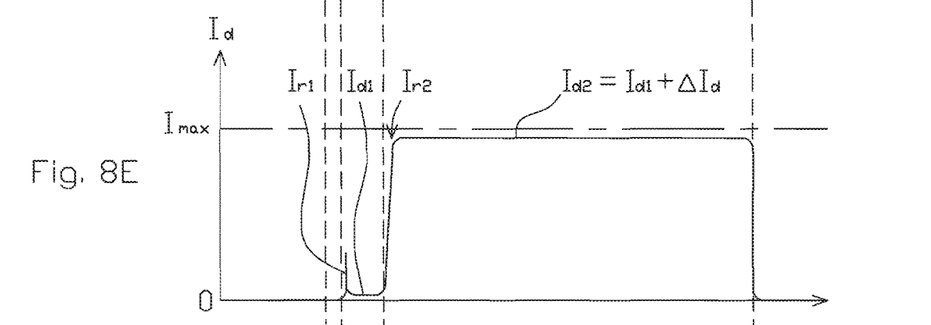

Next, at time $t_2$, a little later than time $t_1$, the main control unit 9 causes the luminous signal $S_{L1}$ to be "1" for a standby time period $P_1$ as illustrated in FIG. 8B. Therefore, the switch 82" is turned on, so that the constant voltage generating circuit 81" generates the input voltage $V_{in1}$. In this case, the luminous signal $S_{L2}$ is still at the level "0" as illustrated in FIG. 8C, so that the switch 12 is turned off. Therefore, the constant voltage generating circuit 81" generates the input voltage $V_{in1}$ at the output terminal $T_5$ as illustrated in FIG. 8D. As a result, the drive current $I_d$ rises to $I_{d1}$ as illustrated in FIG. 8E. In this case, the current $I_{d1}$ includes a relatively large rush current $I_{r1}$ which is, however, much smaller than the absolute maximum rated current $I_{max}$.

Next, at time $t_3$, after the standby time period $P_1$ has passed, the main control unit 9 causes the luminous signal $S_{L2}$ to be "1" as illustrated in FIG. 8C. Therefore, the switch 12 is turned on. As a result, the shunt resistor 11 is electrically connected between the step-up DC-DC converter 3 and the LED module 1, so that the drive current $\Delta I_d$ flowing through the shunt resistor 11 is added to the drive current $I_{d1}$ flowing through the current sense resistor 2. Thus, the total drive current $I_{d2}$ is: $I_{d2}=I_{d1}+\Delta I_d$. As a result, as illustrated in FIG. 8E, the drive current $I_d$ is increased from $I_{d1}$ to $I_{d2}$. In this case, generation of a rush current as indicated by $I_{r2}$ in the drive current $I_{d2}$ can be suppressed by the two-stepped drive current $I_d$. Actually, such a rush current $I_{r2}$ is hardly recognized. Therefore, the drive current $I_{d2}$ for a stable time period $P_2$ can be close to the maximum rated current $I_{max}$ while maintaining it below the absolute maximum rated current $I_{max}$.

Next, at time $t_4$, the main control unit 9 causes the luminous signals $S_{L1}$ and $S_{L2}$ to be 0, thus completing the stable time period $P_2$.

Figure 8F:
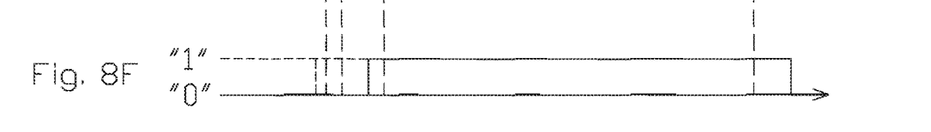

Also, as illustrated in FIG. 8F, which shows the opening of the shutter (not shown), the main control unit 9 opens the shutter to cover the stable time period $P_2$. In this case, the start time of opening the shutter is before time $t_2$ or between time $t_2$ and time $t_3$, while the end time of opening the shutter is after time $t_4$.

Further, in the above-described third embodiment, since the shunt resistor 11 adds the drive current $\Delta I_d$ to the drive current $I_{d1}$ for a stable time period $P_2$, the drive current $I_d$ flowing through the LED module 1 can be two-stepped. As a result, the rush current $I_{r2}$ for the stable time period $P_2$ can be suppressed while the drive current $I_{d2}$ for the stable time period $P_2$ can be increased.

It will be apparent to those skilled in the art that various modifications and variations can be made in the presently disclosed subject matter without departing from the spirit or scope of the presently disclosed subject matter. Thus, it is intended that the presently disclosed subject matter covers the modifications and variations of the presently disclosed subject matter provided they come within the scope of the appended claims and their equivalents. All related or prior art references described above and in the Background section of the present specification are hereby incorporated in their entirety by reference.

The invention claimed is:

1. A strobe apparatus comprising:
 a light-emitting semiconductor module;
 a current sense resistor connected in series to said light-emitting semiconductor module and adapted to sense a drive current flowing through said light-emitting semiconductor module to generate a sense voltage;
 a step-up voltage converter connected to said light-emitting semiconductor module and said current sense resistor and adapted to supply said drive current to said light-emitting semiconductor module and said current sense resistor; and
 a voltage converter controlling unit connected to said step-up voltage converter and said current sense resistor, and adapted to control said step-up voltage converter in accordance with a difference between said sense voltage and an input voltage, so that said drive current has a first level current followed by a second level current larger than said first level current.

2. The strobe apparatus as set forth in claim 1, further comprising an input circuit connected to said voltage converter controlling unit and adapted to generate said input voltage having a first level voltage corresponding to said first level current followed by a second level voltage corresponding to said second level current larger than said first level voltage.

3. The strobe apparatus as set forth in claim 2, further comprising a main control unit connected to said input circuit and adapted to control said input circuit,
 said input circuit comprising a digital-to-analog converter,
 said main control unit being adapted to transmit a first level digital signal to said digital-to-analog converter to generate said first level voltage, then transmit a second level digital signal whose digital value is larger than that of said first level digital signal to said digital-to-analog converter to generate said second level voltage.

4. The strobe apparatus as set forth in claim 2, further comprising a main control unit connected to said input circuit and adapted to control said input circuit,
 said input circuit comprising:
 a constant voltage generating circuit adapted to generate said second level voltage;
 a voltage divider adapted to divide said second level voltage to generate said first level voltage;
 a first switch connected between a battery and said constant voltage generating circuit;
 a second switch connected between an output of said constant voltage generating circuit and said voltage divider; and
 a third switch connected between the output of said constant voltage generating circuit and an output of said input circuit,
 said main control unit being adapted to operate said first, second and third switches to transmit said first level voltage to the output of said input circuit and then to operate said second and third switches to transmit said second level voltage to the output of said input circuit.

5. The strobe apparatus as set forth in claim 1, further comprising:
an input circuit including a constant voltage generating circuit connected to said voltage converter controlling unit;
a series of a shunt resistor and a switch connected between ends of said current sense resistor; and
a main control unit connected to said input circuit and said switch,
said main control unit being adapted to transmit a first luminous signal to said input circuit to generate a first level voltage corresponding to said first level current so that said first level current flows through said light-emitting semiconductor module and said current series resistor, and then to transmit a second luminous signal to said switch to turn on said switch so that a current flowing through said shunt resistor is added to said first level current to form said second level current supplied to said light-emitting semiconductor module.

6. The strobe apparatus as set forth in claim 1, wherein said first level current is 3 to 50 percent of said second level current.

7. The strobe apparatus as set forth in claim 1, wherein a time period of said first level current flowing through said light-emitting semiconductor is 0.5 ms or more.

8. The strobe apparatus as set forth in claim 1, wherein said step-up voltage converter comprises:
an inductor having an input connected to a first power supply terminal and an output;
a switching element connected between the output of said inductor and a second power supply terminal;
a rectifier element connected to the output of said inductor; and
a capacitor connected to said rectifier element, and
wherein said step-up voltage converter controlling unit comprises:
an error amplifier connected to said current sense resistor and adapted to amplify said sense voltage;
a comparator connected to said error amplifier and said input circuit and adapted to generate a difference signal between said sense voltage and said input voltage,
an oscillation signal generating circuit adapted to generate an oscillation signal;
a pulse width modulation signal generating circuit connected to said comparator and said oscillation signal generating circuit and adapted to generate a pulse width modulation signal; and
a driver connected to said pulse width modulation signal generating circuit and said switching element and adapted to operate said switching element by said pulse width modulation signal.

9. The strobe apparatus as set forth in claim 1, wherein said second level current is below an absolute maximum rated current of said light-emitting semiconductor module and close to said absolute maximum rated current.

10. A strobe apparatus comprising:
a light-emitting semiconductor module;
a current sense resistor connected in series to said light-emitting semiconductor module and adapted to sense a drive current flowing through said light-emitting semiconductor module to generate a sense voltage;
a step-up voltage converter connected to said light-emitting semiconductor module and said current sense resistor and adapted to supply said drive current to said light-emitting semiconductor module and said current sense resistor;
a voltage converter controlling unit connected to said step-up voltage converter and said current sense resistor, and adapted to control said step-up voltage converter in accordance with a difference between said sense voltage and an input voltage; and
an input circuit connected to said voltage converter controlling unit and adapted to generate said input voltage having a first level voltage followed by a second level voltage larger than said first level voltage.

11. The strobe apparatus as set forth in claim 10, further comprising a main control unit connected to said input circuit and adapted to control said input circuit,
said input circuit comprising a digital-to-analog converter,
said main control unit being adapted to transmit a first level digital signal to said digital-to-analog converter to generate said first level voltage, then transmit a second level digital signal whose digital value is larger than that of said first level digital signal to said digital-to-analog converter to generate said second level voltage.

12. The strobe apparatus as set forth in claim 10, further comprising a main control unit connected to said input circuit and adapted to control said input circuit,
said input circuit comprising:
a constant voltage generating circuit adapted to generate said second level voltage;
a voltage divider adapted to divide said second level voltage to generate said first level voltage;
a first switch connected between a battery and said constant voltage generating circuit;
a second switch connected between an output of said constant voltage generating circuit and said voltage divider; and
a third switch connected between the output of said constant voltage generating circuit and an output of said input circuit,
said main control unit being adapted to operate said first, second and third switches to transmit said first level voltage to the output of said input circuit and then to operate said second and third switches to transmit said second level voltage to the output of said input circuit.

13. A strobe apparatus comprising:
a light-emitting semiconductor module;
a current sense resistor connected in series to said light-emitting semiconductor module and adapted to sense a drive current flowing through said light-emitting semiconductor module to generate a sense voltage;
a step-up voltage converter connected to said light-emitting semiconductor module and said current sense resistor and adapted to supply said drive current to said light-emitting semiconductor module and said current sense resistor;
a voltage converter controlling unit connected to said step-up voltage converter and said current sense resistor, and adapted to control said step-up voltage converter in accordance with a difference between said sense voltage and an input voltage; and
an input circuit including a constant voltage generating circuit connected to said voltage converter controlling unit;
a series of a shunt resistor and a switch connected between ends of said current sense resistor; and
a main control unit connected to said input circuit and said switch,
said main control unit being adapted to transmit a first luminous signal to said input circuit to generate said input voltage so that said drive current flows through said light-emitting semiconductor module and said current series resistor, and then to transmit a second luminous signal to said switch to turn on said switch so that a current flowing through said shunt resistor is added to said drive current flowing through said light-emitting semiconductor module.

\* \* \* \* \*